United States Patent
Yang et al.

(10) Patent No.: US 8,082,730 B2
(45) Date of Patent: Dec. 27, 2011

(54) ENGINE SYSTEM HAVING PARTICULATE REDUCTION DEVICE AND METHOD

(75) Inventors: Nan Yang, Dunlap, IL (US); Jeff A. Jensen, Dunlap, IL (US); Michael Pollard, Peoria, IL (US); Jamie Stringfield, Peoria, IL (US); Herbert DaCosta, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 763 days.

(21) Appl. No.: 12/154,068

(22) Filed: May 20, 2008

(65) Prior Publication Data

US 2009/0288392 A1 Nov. 26, 2009

(51) Int. Cl.
*F01N 3/022* (2006.01)

(52) U.S. Cl. .............................. 60/295; 60/280; 60/311

(58) Field of Classification Search ................ 60/280, 60/295, 311
See application file for complete search history.

(56) References Cited

U.S. PATENT DOCUMENTS

| | | | |
|---|---|---|---|
| 4,427,418 A * | 1/1984 | Kogiso et al. | 55/287 |
| 5,293,742 A * | 3/1994 | Gillingham et al. | 60/288 |
| 5,603,216 A | 2/1997 | Guile et al. | |
| 5,941,068 A | 8/1999 | Brown et al. | |
| 6,058,698 A | 5/2000 | Coral et al. | |
| 6,338,245 B1 | 1/2002 | Shimoda et al. | |
| 6,594,990 B2 | 7/2003 | Kuenstler et al. | |
| 6,625,978 B1 | 9/2003 | Eriksson et al. | |
| 6,666,020 B2 | 12/2003 | Tonetti et al. | |
| 6,871,489 B2 | 3/2005 | Tumati et al. | |
| 6,922,891 B1 * | 8/2005 | Marino, Jr. | 29/890 |
| 7,104,051 B2 | 9/2006 | Shimasaki et al. | |
| 7,107,764 B1 | 9/2006 | Opris et al. | |
| 7,263,825 B1 | 9/2007 | Wills et al. | |
| 7,296,403 B2 | 11/2007 | Goebelbecker | |
| 7,299,793 B1 | 11/2007 | Tyo et al. | |
| 7,334,397 B2 | 2/2008 | Blomquist | |
| 2004/0079060 A1 * | 4/2004 | Alward | 55/523 |
| 2004/0133334 A1 | 7/2004 | Nakano et al. | |
| 2006/0086546 A1 * | 4/2006 | Hu et al. | 180/65.2 |
| 2007/0130946 A1 * | 6/2007 | Winsor et al. | 60/605.1 |
| 2008/0120968 A1 * | 5/2008 | Beall et al. | 60/295 |
| 2010/0018203 A1 * | 1/2010 | Richards | 60/598 |

* cited by examiner

*Primary Examiner* — Kenneth Bomberg
*Assistant Examiner* — Jonathan Matthias
(74) *Attorney, Agent, or Firm* — Liell & McNeil

(57) ABSTRACT

An internal combustion engine system includes an engine having an engine housing. The engine system further includes an exhaust system, and a turbine disposed within the exhaust system. A particulate reduction device is disposed in the exhaust system upstream of the turbine. The particulate reduction device includes an exhaust retarder having a flow property which is based at least in part on a residence requirement for combustion of particulates in exhaust gases passing therethrough. The flow property may be a flow restriction property, and the exhaust retarder may include a flow restricting trapping element configured to trap particulates in the exhaust gases. The flow restricting trapping element defines a combustion efficacy to exhaust mass flow and temperature coefficient for the particulate reduction device which is based at least in part on a combustion initiating residence requirement for particulates passing through the particulate reduction device.

18 Claims, 3 Drawing Sheets

US 8,082,730 B2

ENGINE SYSTEM HAVING PARTICULATE REDUCTION DEVICE AND METHOD

TECHNICAL FIELD

The present disclosure relates generally to emissions reduction and aftertreatment strategies used in internal combustion engines, and relates more particularly to reducing particulates via a particulate reduction device disposed in an exhaust system at a location upstream a turbine.

BACKGROUND

Operation of internal combustion engines typically results in the generation of particulate matter, including inorganic species (ash), sulfates, small organic species generally referred to as soluble organic fraction (SOF), and hydrocarbon particulates or "soot." Various strategies have been used for preventing the release of such particulate matter into the environment, including the use of particulate filters, available in a variety of designs. Particulate filters are used in both on-highway and off-highway applications, and typically include a porous ceramic material positioned in the path of exhaust exiting the engine. The particulate filter traps particulate matter in the exhaust gases, reducing its release via the engine tailpipe or exhaust stack.

Over time, accumulating particulate matter in a conventional filter will tend to impede exhaust flow through the filter, resulting in a pressure drop. Periodically, conventional filters need to be cleaned. A variety of strategies are known for "regenerating" a particulate filter, often by heating the particulate matter to a temperature at which the trapped particles combust or oxidize. Specialized hardware such as electrical heaters and fuel injection devices and/or engine operating strategies are commonly used for filter regeneration, adding expense, size and complexity to an engine system and its controls. Filters are also typically sized to allow a relatively large amount of particulate matter to be accumulated without substantially affecting performance, so that regeneration cycles are necessary relatively infrequently. In addition, filter volumes typically account for the need to trap ash from combusted particulates. Certain designs use precious metal catalysts to enable essentially continuous regeneration, reducing the need for other regeneration hardware or controls. These designs, however, have their own drawbacks, notably expense.

Further considerations in particulate filter and overall engine system design relate to the positioning of particulate filters within an engine system. In many modern internal combustion engine systems, particularly compression ignition diesel engine systems, one or more turbochargers are used to extract energy from engine exhaust. Conventional wisdom has been to position turbochargers upstream a particulate filter, in part due to the relatively higher energy of the exhaust prior to its passing through a particulate filter. A further consideration driving filter positioning has been the relative sensitivity of common filter materials to temperature conditions at different locations in an exhaust system. Exhaust temperatures upstream a turbocharger tend to vary relatively widely and rapidly, causing problems in conventional filter materials. The heat release associated with filter regeneration can further compound this problem. It will thus be recognized that many conventional particulate filters tend to be relatively large, complex and expensive pieces of equipment, with limited design and placement flexibility in an engine system.

SUMMARY

In one aspect, an internal combustion engine system includes an engine having an engine housing. The engine system further includes an exhaust system, including an exhaust manifold coupled with the engine housing. A turbine is disposed within the exhaust system, and a particulate reduction device is disposed in the exhaust system at a location which is fluidly between the turbine and the exhaust manifold. The particulate reduction device includes an exhaust retarder having a flow property which is based at least in part on a residence requirement for combustion of particulates in exhaust gases passing through the particulate reduction device.

In another aspect, a method of treating exhaust gases in an internal combustion engine system includes a step of passing exhaust gases from an internal combustion engine through a particulate reduction device. The method further includes the steps of combusting particulates within the particulate reduction device at least in part by retarding the exhaust gases via the particulate reduction device, and rotating a turbine via the exhaust gases, subsequent to the combusting step.

In still another aspect, an exhaust system segment for an exhaust system of an internal combustion engine includes a housing having an exhaust inlet configured to fluidly connect with an upstream segment of the exhaust system and an exhaust outlet configured to fluidly connect with a downstream segment of the exhaust system having a turbine positioned therein. An exhaust flow retarder is positioned within the housing, the exhaust flow retarder being configured to reduce particulates in exhaust gases passing between the exhaust inlet and the exhaust outlet at least in part by increasing a residence time of the particulates to a combustion initiating residence time within the exhaust system segment. The exhaust flow retarder further includes a self-regenerating trapping element defining a combustion efficacy to exhaust mass flow and temperature coefficient for the exhaust system segment which is based at least in part on the combustion initiating residence time.

DETAILED DESCRIPTION

Figure 1:
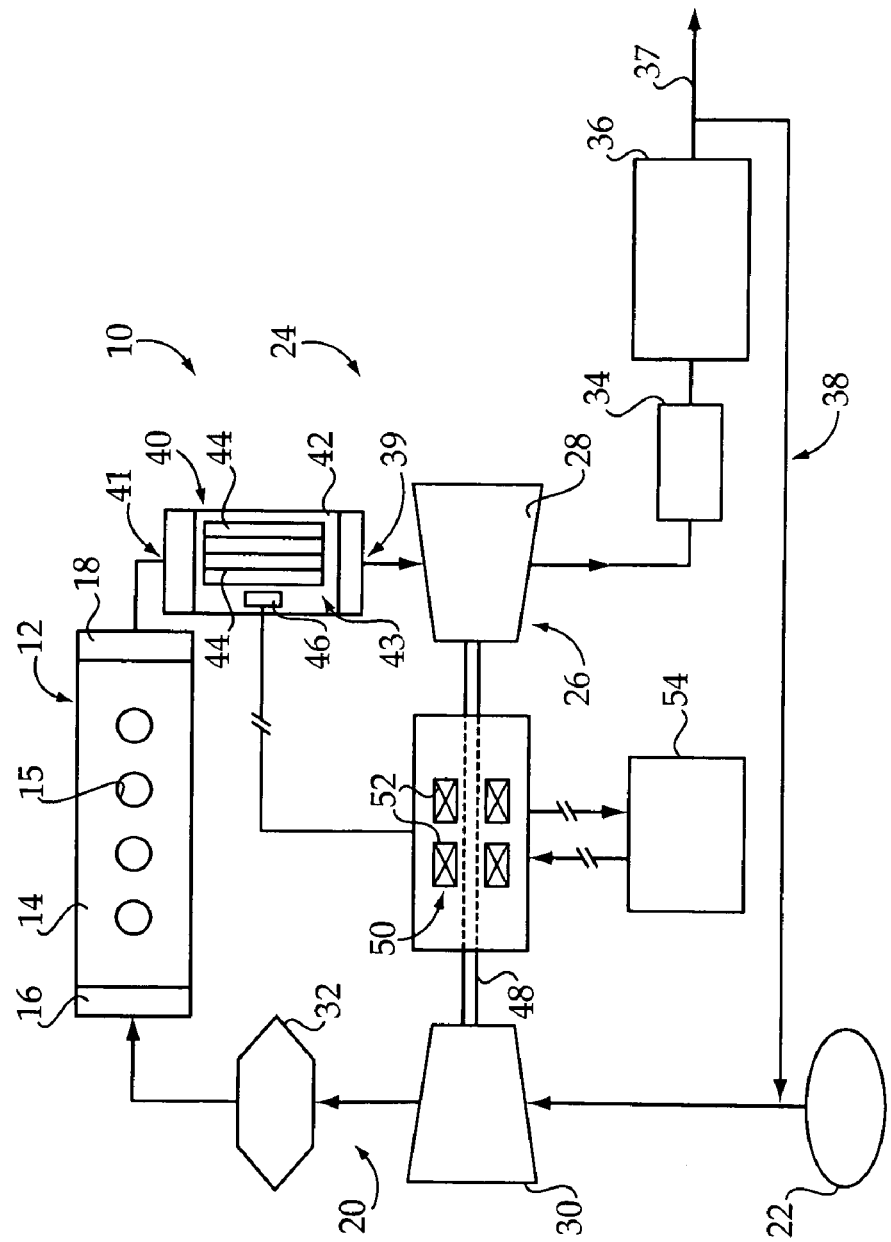
FIG. 1 is a diagrammatic view of an engine system according to one embodiment.

Referring to FIG. 1, there is shown an internal combustion engine system 10 according to one embodiment. Engine system 10 may be a compression ignition diesel engine system, but might be a spark ignited engine system in other embodiments. Engine system 10 will be suitable for use in a variety of stationary or mobile applications. Thus, engine system 10 may be used to power a machine such as a truck, a tractor, a wheel loader or a telehandler, for example. Engine system 10 could also be used in electrical power generation, as part of a genset or in an electric drive system, for example. Engine system 10 may include an engine 12 having an engine housing 14 with a plurality of cylinders 15 therein. Engine 12 may further include an intake manifold 16 which is part of an intake system 20 configured to supply combustion air to engine 12. Intake system 20 may include an intake element 22 which receives ambient air, a compressor 30 and an aftercooler 32 to cool air compressed via compressor 30 in a conventional manner. Engine system 10 may also include an exhaust system 24 which includes a turbine 28 disposed therein. In one embodiment, turbine 28 and compressor 30 may be part of a turbocharger 26 which includes a shaft 48 rotatably coupling compressor 30 and turbine 28 together. Exhaust system 24 may further include an aftertreatment element such as a selective catalytic reduction or "SCR" element 34, and a removable ash filter 36, the significance of which will be apparent from the following description.

Exhaust system 24 may still further include an exhaust manifold 18 coupled with engine housing 14, and a particulate reduction device 40 which is disposed at a position fluidly between exhaust manifold 18 and turbine 28, and therefore upstream turbine 28. As further described herein, particulate reduction device 40 may be uniquely adapted to reduce particulates in exhaust from engine 12, without substantially impacting operation of turbocharger 26, and may be robustly constructed and configured to tolerate the relatively demanding environment in exhaust system 24 between exhaust manifold 18 and turbine 26, where exhaust temperatures may be between about 500° C. and about 760° C. Particulate reduction device 40 may be understood to comprise a segment of exhaust system 24. Thus, particulate reduction device 40 may include an exhaust inlet 41 connecting with an upstream segment of exhaust system 24, which extends to engine housing 14. Particulate reduction device 40 may also include an exhaust outlet 39 configured to connect with a downstream segment of exhaust system 24, which extends to exhaust system outlet 37. An exhaust gas return loop 38 may be provided to enable cleaned exhaust gases from exhaust system 24 to be supplied to intake system 20 in a conventional manner. "Clean" gas intake systems, as well as conventional recirculation of raw exhaust gases are contemplated herein, having a variety of known configurations and fluid connection designs, although embodiments are also possible wherein exhaust gases are not returned, recirculated, etc.

Figure 2:
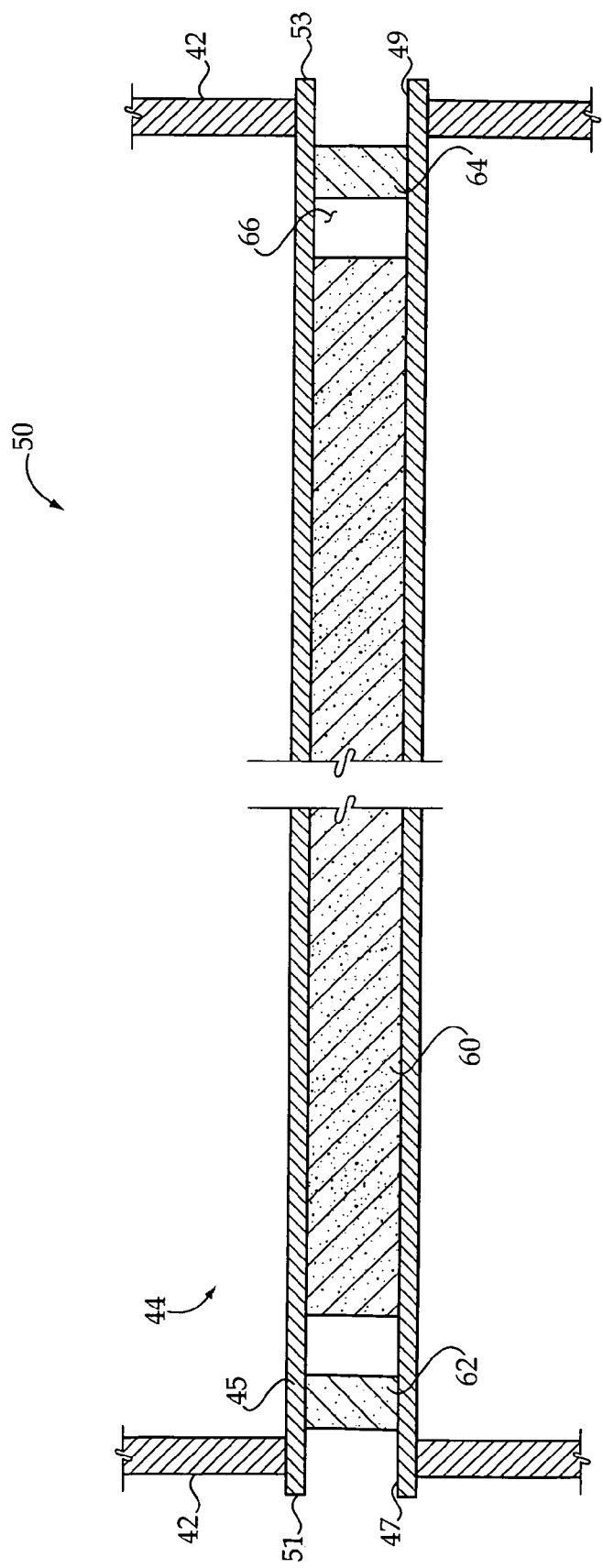
FIG. 2 is a sectioned side diagrammatic view of a filter element, according to one embodiment.

Particulate reduction device 40 may further include a housing 42, having an exhaust retarder 43 positioned therein. In one embodiment, exhaust retarder 43 may include one or more filter elements 44. Particulate reduction device 40 may also include a regeneration device 46, such as a resistive electrical regeneration device, as further described herein. Referring also to FIG. 2, there is shown one example embodiment of a filter element 44 suitable for use in connection with exhaust retarder 43. Filter element 44 may include a first end 51 having an inlet 47, and a second end 53 having an outlet 49. Filter element 44 may be supported in housing 42 at each of its respective ends 51 and 53. Filter element 44 may further include a tube 45 defining an interior space 66, and having a filter medium 60 disposed therein. Filter element 44 may further include a porous plug 62 positioned between filter medium 60 and inlet 47, and another porous plug 64 positioned between filter medium 60 and outlet 49.

In one embodiment, exhaust retarder 43 may include a flow restricting trapping element comprised of the one or more filter elements 44 positioned within housing 42. In one further embodiment, each filter element 44 may include a filter cartridge and the flow restricting trapping element may be comprised of a plurality of flow-through filter cartridges arranged in parallel. The use of separate cartridges is considered to be one practical implementation strategy, however, in other embodiments a monolithic filter element or the like might be used. Use of a plurality of flow-through cartridges arranged in parallel allows feeding exhaust gases into exhaust inlet 41 of particulate reduction device 40, and passing the exhaust gases between exhaust inlet 41 and exhaust outlet 39 of particulate reduction device 40 without changing an average flow direction of the exhaust gases. In other words, exhaust gases will be received via inlet 41, passed through filter elements 44, and then expelled out of exhaust outlet 39. This configuration differs from conventional wall-flow designs where a change in average flow direction of exhaust gases occurs, commonly two or more changes in flow direction of about 90°. The flow-through design also provides a relatively smaller pressure drop between inlet 41 and outlet 39, as further explained herein.

Each tube 45 will typically be non-perforated. Filter medium 60 may include a fibrous metallic filter material, such as a suitable non-sintered fibrous metallic filter medium. A variety of non-sintered metallic filter media are known and commercially available. In still other embodiments, alternatives to non-sintered metal fibers might be used, however, the use of a fibrous metallic material disposed within each tube 45 between the corresponding inlet 47 and outlet 49 is considered to be a practical implementation strategy. One suitable design for filter elements 44 according to the present disclosure is known from commonly owned U.S. patent application Ser. No. 12/011,860, filed Jan. 30, 2008, and now published as United States Patent Application Publication No. 2009/0188389 A1.

Engine system 10 may further include a rotary assist mechanism 50 which is coupled with turbocharger 26 and configured to selectively rotate turbocharger 26. Configuring particulate reduction device 40 as described above, using a plurality of flow-through cartridges 44, is considered to create less of an exhaust pressure drop than what might be expected with other designs, notably conventional wall-flow particulate filter designs. There will nevertheless tend to be some pressure drop associated with passing exhaust gases through particulate reduction device 40. Under certain engine conditions, further described herein, rotary assist mechanism 50 may be used to selectively rotate turbocharger 26, such as in response to transients. In one embodiment, rotary assist mechanism 50 may be an electrical rotary assist mechanism, which is operable in two different modes, including for example a turbocharger assist mode and an electrical generating mode.

Under conditions where ample exhaust energy is available for rotating turbine 28, and assistance via rotary assist mechanism 50 unnecessary, exhaust energy may be used to operate rotary assist mechanism 50 in its electrical generating mode. To this end, mechanism 50 may be coupled with an energy storage device 54, such as a battery, to store electrical energy generated when rotary assist mechanism 50 is operated in the electrical generating mode. It should be noted that electrical energy stored in energy storage device 54 may also be used to power mechanism 50 in its turbocharger assist mode. In one embodiment, rotary assist mechanism 50 may include a set of coils 52, and may be a variable power device. Selectively using one of coils 52 may provide relatively lower power turbocharger assist, whereas using both of coils 52 may provide for relatively higher power. Selective use of either one or both of coils 52 might also be used to vary in a power generating mode. Thus, in one embodiment rotary assist mechanism 50 may be understood as including both of an electric motor and an electrical generator, and may have a variable power input or output range.

As discussed above, exhaust particulate filters typically need to be regenerated periodically to avoid excess accumulation of particulate matter therein. Conventional exhaust particulate filters also tend to be relatively large to enable accumulation of a relatively large amount of particulate matter between regeneration cycles without substantially affecting engine system performance. In other words, particulate filters tend to be relatively large to avoid creating excessive back pressure in the exhaust system as particulates accumulate. Most exhaust particulate filters also have a relatively large volume to allow them to trap ash from combusted particulates. The present disclosure does not suffer from the shortcomings with regard to size and regenerating hardware, etc., associated with earlier strategies. This is possible in part because particulate reduction device 40 is self-regenerating, at least at relatively higher engine loads. In other words, during at least certain engine operating conditions, the temperature, pressure and other factors associated with exhaust passing through particulate reduction device 40 are such that particulates within the exhaust gases as well as any particulates accumulated in filter elements 44, will oxidize to regenerate particulate reduction device 40. Where engine system 10 is operated at certain conditions, regeneration of particulate reduction device 40 may be continuous.

An auxiliary regeneration device, such as electrical regeneration device 46, may be used to regenerate particulate reduction device 40 if desired. During extended periods of operation at relatively lower load conditions, for example, engine conditions may not be appropriate for self-regeneration, and particulate matter may accumulate in particulate reduction device 40. As discussed above, mechanism 50 may be operated to charge electrical energy storage device 54. Electrical energy storage device 54 may be electrically connected with regeneration device 46. When engine system 10 has been operated under conditions where particulate reduction device 40 accumulates particulates, energy storage device 54 may be used to power regeneration device 46, providing supplemental heat to particulate reduction device 40 to initiate combustion of accumulated particulates.

Since at least much of the time particulate reduction device 40 can self-regenerate, the capacity of particulate reduction device 40 to store particulate matter may be significantly less than that required in a conventional particulate filter. Particulate filters positioned downstream of a turbine tend to be subjected to relatively cooler exhaust temperatures which are insufficient to initiate combustion of accumulated particulate matter, without supplemental heat or catalyst. This self-regenerating feature allows particulate reduction device 40 to be made significantly smaller than many conventional exhaust particulate filters. Also, the use of a flow-through design for particular reduction device 40, and associated relatively small pressure drop, can allow ash resulting from combustion of particulates and combustion of fuel in cylinders to be readily blown through particulate reduction device 40. Removable ash filter 36 may be positioned in exhaust system 24 at a location upstream of exhaust system outlet or tailpipe 37. Ash from combustion of particulates in particulate reduction device 40 may be passed through turbine 28, and thenceforth through element 34 and collected in removable ash filter 36. Ash filter 36 may be removed periodically, and emptied, or it might be a single-use replaceable component.

Figure 3:
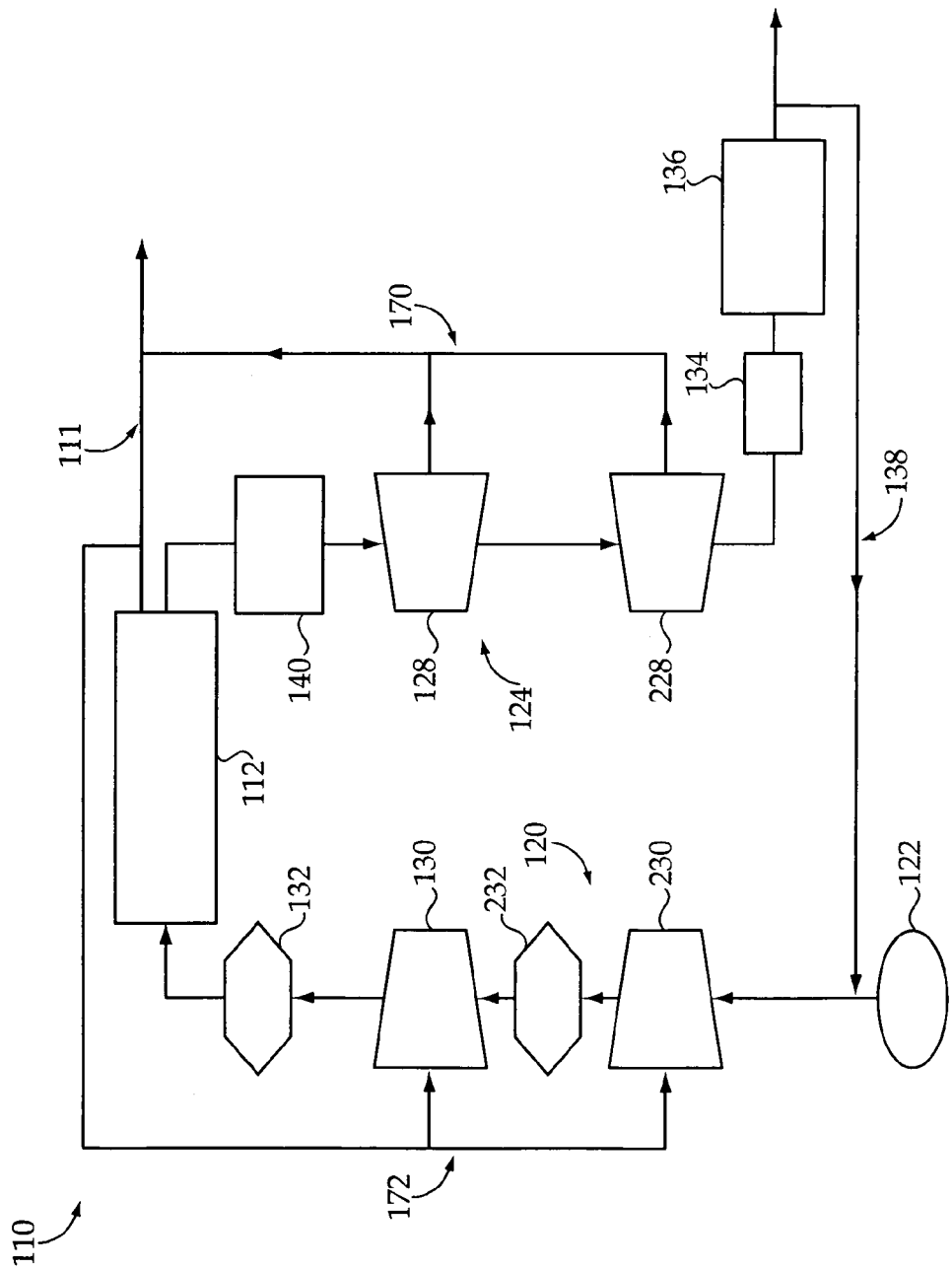
FIG. 3 is a diagrammatic view of an engine system according to one embodiment.

Referring now to FIG. 3, there is shown an engine system 110 according to another embodiment. Engine system 110 is similar in certain respects to engine system 10, described above, but has a number of differences. Engine system 110 includes an engine 112, an intake system 120 which includes a first compressor 230 and a first aftercooler 232, a second compressor 130 and a second aftercooler 132. Engine system 110 further includes an exhaust system 124 having a first turbine 128, a second turbine 228, an SCR element 134 and a removable ash filter 136. Engine system 110 also includes a particulate reduction device 140 disposed in exhaust system 124. Particulate reduction device 140 may include a configuration, properties, components and operating characteristics similar or identical to those of particulate reduction device 40, described above. Certain details of particulate reduction device 140 are thus not shown or specifically described in connection with FIG. 3. Descriptions herein of particulate reduction device 40 should therefore be understood to refer similarly to particulate reduction device 140 of FIG. 3.

Engine system 110 of FIG. 3 may differ from engine system 10 of FIG. 1 in several ways. It will be noted that engine system 110 includes two turbines 128 and 228, and two compressors 130 and 230. Turbines 128 and 228 might include two axial turbines, two radial turbines, or one axial turbine and one radial turbine. The two turbines 128 and 228 can extract energy from exhaust passing through exhaust system 124 in two stages. Compressors 130 and 230 may compress air in intake system 120 in two stages. Rather than rotating compressors 130 and 230 via turbines 128 and 228, as might be done in a conventional two-stage turbocharger design, compressors 130 and 230 may be powered via a power link 172 with an output element 111 of engine 112, such as a crankshaft. Power link 172 may include one or both of a mechanical link and an electrical link with engine 112. In other words, compressors 130 and 230 might be powered via rotation of an output shaft of engine 112, or they might be powered via an electric motor driven via a generator coupled with an output shaft of engine 112, for example. Turbines 128 and 228 may similarly be coupled with engine 112 via a power link 170, also including one or both of a mechanical link and an electrical link with engine 112. Turbines 128 and 228 might mechanically assist rotation of engine 112, they might be used to power an electric motor configured to assist rotation of engine 112 or they might charge an electrical energy storage device. It will thus be readily apparent that a wide variety of embodiments are possible according to the present disclosure by varying the layout and components of engine system 110, as well as the layout and components of engine system 10 or by combining the features of engine systems 10 and 110 with one another or with other concepts known to those of skill in the art.

Returning to FIG. 1, as discussed above, under certain engine system conditions, particulates which are carried via exhaust through particulate reduction device 40 will tend to oxidize without the need for any supplemental regeneration hardware or engine operating strategies, such as post injections, and without an oxidation catalyst. The temperature of exhaust gases passing from engine 12 to particulate reduction device 40 will typically determine in part whether conditions in particulate reduction device 40 are appropriate for self-regeneration. It has been observed, however, that temperature is not the only factor determining whether oxidation of particulate matter can occur continuously or semi-continuously within particulate reduction device 40. In addition to temperature, a residence time for combustion of particulates in the exhaust gases will typically need to be met. In other words, even where exhaust gases passing through particulate reduction device 40 are at a temperature sufficient to initiate combustion of particulates, if the particulate matter does not spend sufficient time within particulate reduction device 40, combustion may not occur and the particulates may be blown through particulate reduction device 40. In general, higher exhaust temperature will correlate with a lower required residence time, and vice versa. As used herein, temperature, required residence time and potentially other known or to be discovered factors, may be understood as a residence requirement for combustion of particulates in particulate reduction device 40.

To this end, exhaust retarder 43 may have a flow property which is based at least in part on a residence requirement for combustion of particulates in exhaust gases passing through particulate reduction device 40. In one embodiment, the flow property may be a flow restriction property, such that flow of exhaust gases is sufficiently restricted to keep particulates within particulate reduction device 40 for a time equal to or greater than a requisite residence time to initiate and substantially complete combustion, for a certain temperature range, such as about 500° C. to about 760° C. In another embodiment, rather than a flow restriction property, a flow path distance for exhaust gases might be used which enables particulates to remain within a particulate reduction device a sufficient length of time to combust. Exhaust retarder 43 may thus, in one embodiment, increase a residence time of particulates in particulate reduction device 40 at least to a combustion initiating residence time. In one further embodiment, the combustion initiating residence time may be a non-catalytic combustion initiating residence time. The non-catalystic combustion initiating residence time may be understood as a residence time required to initiate combustion without the assistance of a catalyst such as platinum within or upstream of particulate reduction device 40. To allow substantially complete combustion of particulates while within particulate reduction device 40, exhaust retarder 43 may be configured to increase the residence time to a combustion completing residence time, in certain embodiments.

As discussed above, exhaust retarder 43 may consist of or include a flow restricting trapping element, comprised of filter elements 44 for example. In one embodiment, particulate reduction device 40 may have a combustion efficacy to exhaust mass flow and temperature coefficient defined by exhaust retarder 43. Combustion efficacy may be understood as the tendency of particulate matter in exhaust gases passing through particulate reduction device 40 to combust under a certain set of conditions. The combustion efficacy to exhaust mass flow and temperature coefficient may thus be understood as describing the relationship between the tendency for particulates to combust in relation to exhaust mass flow and temperature, in particulate reduction device 40.

As engine load increases, exhaust temperature will typically increase. With increasing load, the tendency for particulates in exhaust gases passing through particulate reduction device 40 to combust may therefore tend to increase. Other factors, such as exhaust mass flow, exhaust pressure, turbine back pressure, fuel injection timing, etc., may also affect the tendency for particulates in exhaust gases passing through particulate reduction device 40 to combust. For example, at higher exhaust mass flows, particulates passing through particulate reduction device 40 may be traveling relatively faster and thus have less tendency to be even briefly trapped via exhaust retarder 43. Reduced tendency for particulates to be trapped, and higher exhaust velocity, can in turn be expected to decrease the average amount of time that particulates spend in particulate reduction device 40. An increased exhaust temperature may therefore be necessary to obtain a similar combustion efficacy to what would be possible at lower exhaust mass flows. It may thus be appreciated that numerous variables may affect the tendency for particulates to combust when passing through particulate reduction device 40.

Nevertheless, the relationship between combustion efficacy and exhaust mass flow and temperature can be tailored in designing particulate reduction device 40 to result in optimal performance for a particulate engine system, such as engine system 10. In one embodiment, the combustion efficacy to exhaust mass flow and temperature coefficient may be based in part on the residence requirement for combustion of particulates discussed above, and may be based in part on the combustion initiating residence time. Increased density of filter media 60 will tend to increase the extent to which exhaust retarder 43 slows particulates. Thus, density of filter media 60 will tend to be positively correlated with combustion efficacy. Increasing the density of filter media 60, however, may also result in an increased pressure drop between inlet 41 and outlet 39, which can negatively impact turbocharger performance. By varying filter density, filter length and potentially other factors, the combustion efficacy of particulate reduction device 40 in relation to exhaust mass flow and temperature can be varied. However, density of filter media 60, for example, should not be so high that turbocharger performance is substantially affected. Similarly, density of filter media 60 should generally not be so low that self-regeneration conditions for particulate reduction device 40 are difficult to achieve. In varying the design and placement of particulate reduction device 40, the residence requirement for initiation of combustion of particulates within particulate reduction device 40 may need to be satisfied during at least a majority of an expected duty cycle of engine system 10 to provide self-regeneration conditions at least a majority of the time. However, in other instances, for example where the duty cycle will include reliable periods of high load operation, self-regeneration less than a majority of the time may be acceptable. In most cases, however, the relationship between the tendency for particulates to combust and exhaust mass flow and temperature will be based at least in part on the combustion initiating residence time.

It should be appreciated that combusting trapped particulates or combusting suspended/propelled particulates will tend to generate energy in the form of heat and pressure in exhaust system 24. Since particulate reduction device 40 is located upstream from turbine 28, energy generated by the combustion of particulates in particulate reduction device 40 can be harnessed by turbine 28. It will be recalled that particulate reduction device 40 may define a pressure drop, reducing exhaust pressure between inlet 41 and outlet 39. The increase in exhaust temperature due to combusting particulates in particulate reduction device 40 may compensate, at least in part, for the exhaust pressure drop. Combustion of trapped particulates, for example, after extended periods of low load operation may also tend to assist in reducing turbocharger lag. It might therefore be desirable to activate regeneration device 46 during start-up, for example, to initiate combustion of trapped particulates and therefore provide an additional boost of energy to turbine 28.

INDUSTRIAL APPLICABILITY

As noted above, engine system 10 of FIG. 1 and engine system 110 of FIG. 3 have a number of similarities. The following description of operation of engine system 10 should therefore be understood to refer similarly to operation of engine system 110, except where otherwise noted. In a typical scenario, operation of engine system 10 may be initiated in a conventional manner, via a starter, etc. Upon starting engine system 10, combustion of air and a fuel, such as diesel fuel, in cylinders 15 will commence. Exhaust gases generated via combustion of fuel and air in cylinders 15 may be passed via exhaust manifold 18 to particulate reduction device 40. Although particulate reduction device 40 is shown as a separate component in FIG. 1, in other embodiments particulate reduction device 40 might be made an integral component with exhaust manifold 18. As exhaust gases pass through particulate reduction device 40, particulates carried by the exhaust gases may be trapped via filter elements 44. After passing through particulate reduction device 40, the exhaust gases may thenceforth pass through turbine 28, then through SCR element 34, ash filter 36 and out of exhaust outlet 37. A valve or the like (not shown) may be positioned between exhaust system 24 and exhaust loop 38, to control a relative amount of exhaust gases which are returned to intake system 20.

Under relatively lower load conditions the available exhaust energy for rotating turbine 28 may be relatively low. Rotary assist mechanism 50 could be used to rotate turbocharger 26, to hasten an increase in boost pressure. In certain instances, regeneration of particulate reduction device 40 might also be used to provide additional exhaust energy, and therefore increase turbocharger speed. In many cases where engine 12 is operating at low loads, however, the need for boost pressure may be relatively low. In such instances, the exhaust pressure which is available may be used to rotate turbine 28 to charge energy storage device 54. Rotary assist mechanism 50 might also be used in other instances to reduce turbocharger lag. The usual time lag between a commanded increase in engine speed or load, such as via increased fueling, and response of a turbocharger to the commanded increase will be familiar to those skilled in the internal combustion engine arts. In addition, as alluded to above, mechanism 50 could be used to impart rotational energy to turbocharger 26 during transient engine load increases or could be used to convert rotational energy to electrical energy during transient load drops.

After an initial start-up period, engine load may be increased. As engine load increases, exhaust gas temperatures will typically increase, and the tendency for particulates to combust when passing through particulate reduction device 40 will also increase. The tendency for particulates already trapped in particulate reduction device, if any, to combust will also tend to increase. Typically, engine system 10 will reach a set of conditions where essentially all of the particulates passing through particulate reduction device 40 will combust, at which conditions particulate reduction device 40 will be self-regenerating. Self-regeneration of particulate reduction device 40 will typically continue so long as engine system 10 is operated at a high enough load. Depending upon a duty cycle of engine system 10, however, there may be periods of time where engine system 10 is not operated such that particulate reduction device 40 will self-regenerate. Under such conditions, regeneration device 46 may be used, or some other strategy such as post injections or injection of fuel directly into exhaust system 24 might be used to initiate regeneration of particulate reduction device 40. Alternatively, since particulate reduction device 40 may have at least some tolerance for accumulation of particulates, trapped particulates might simply be allowed to accumulate until engine system 10 is again operated in a load range where self-regeneration of particulate reduction device 10 can occur.

It is contemplated that increased exhaust energy for rotating turbine 28 from the combustion of particulates during regeneration of particulate reduction device 40, and the ability to assist rotation of turbocharger 26 via rotary assist mechanism 50, may result in turbocharger performance which is superior to known designs, both with regard to efficiency and responsiveness. Moreover, the reduced volume requirements for particulate reduction device 40 over many conventional filters will tend to make packaging more flexible and more cost effective. Size and expense may be further reduced by using the flow-through design described herein for filter elements 44. Since exhaust system 24 may be entirely free from expensive oxidation catalysts, such as platinum, the overall system expense may be significantly reduced. Particulate reduction device 40 may also serve as a pressure buffer for turbocharger 26, such that pressure to turbine 28 may be relatively constant, and pressure changes may be relatively gradual. Turbochargers are commonly designed for optimal performance within a relatively narrow range of conditions, and particulate reduction device 40 may in some instances increase the proportion of time that conditions are optimal for operating turbocharger 26.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. For instance, while particulate reduction device 40 will typically be positioned upstream from a turbocharger, in some embodiments device 40 might be positioned between two turbochargers such that it is upstream one turbocharger and downstream another turbocharger. While an oxidation catalyst will not be required in most embodiments, particulate reduction device 40 might include an oxidation catalyst, or an oxidation catalyst might be positioned upstream particulate reduction device 40 in other embodiments. Other aspects, features and advantages will be apparent upon an examination of the attached drawings and appended claims

What is claimed is:

1. An internal combustion engine system comprising:
an engine, including an engine housing;
an exhaust system, including an exhaust manifold coupled with the engine housing;
a turbine disposed within the exhaust system;
a particulate reduction device disposed in the exhaust system at a location which is fluidly between the turbine and the exhaust manifold;
the particulate reduction device including an exhaust retarder having a flow property which is based at least in part on a residence requirement for combustion of particulates in exhaust gases passing through the particulate reduction device;
wherein the engine system further includes a rotary mechanism rotatable via the turbine to generate energy, an energy storage device coupled with the rotary mechanism, and a regeneration device coupled with the particulate reduction device and with the energy storage device; and
wherein the engine system has a higher load state at which the particulate reduction device self-regenerates such that particulates passing through the particulate reduction device are oxidized via residence therein, a first lower load state at which the particulate reduction device regenerates via energizing the regeneration device with the energy storage device such that particulates trapped within the particulate reduction device are oxidized via supplemental heat of the regeneration device, and a second lower load state at which the rotary mechanism charges the energy storage device.

2. The engine system of claim 1 wherein the flow property is a flow restriction property and wherein the exhaust retarder includes a flow restricting trapping element configured to trap particulates in the exhaust gases.

3. The engine system of claim 2 wherein the flow restricting trapping element includes a fibrous metallic material.

4. The engine system of claim 3 wherein the exhaust flow retarder includes a plurality of flow-through cartridges arranged in parallel and each having a non-perforated tube with an exhaust inlet disposed at a first end thereof and an exhaust outlet disposed at a second end thereof, and each of the flow-through cartridges further having the fibrous metallic material disposed within the non-perforated tube between the corresponding exhaust inlet and the corresponding exhaust outlet.

5. The engine system of claim 4 wherein the fibrous metallic material comprises non-sintered metal fibers.

6. The engine system of claim 3 wherein the exhaust system is free from oxidation catalyst between the exhaust manifold and the turbine.

7. The engine system of claim 1 further comprising a turbocharger which includes the turbine.

8. The engine system of claim 7 wherein the rotary mechanism includes a rotary assist mechanism configured to selectively rotate the turbocharger.

9. The engine system of claim 8 wherein the rotary assist mechanism is electrically powered with the energy storage device in an assist mode, and charges the energy storage device in an electrical generating mode.

10. The engine system of claim 9 wherein the rotary assist mechanism includes an electric motor and an electrical generator.

11. The engine system of claim 1 wherein the exhaust system includes an exhaust system outlet disposed at a location fluidly downstream of the turbine, and further comprising a removable ash filter disposed at a location fluidly between the turbine and the exhaust system outlet.

12. A method of treating exhaust gases in an internal combustion engine system comprising the steps of:
   passing exhaust gases from an internal combustion engine through a particulate reduction device during operating the engine at a higher load;
   combusting particulates within the particulate reduction device at least in part by retarding the exhaust gases via the particulate reduction device such that the particulate reduction device self-regenerates, during operating the engine at the higher load;
   rotating a turbine via the exhaust gases, subsequent to the combusting step;
   passing exhaust gases from the engine through the particulate reduction device during operating the engine at a lower load; and
   rotating the turbine via the exhaust gases such that a rotary mechanism coupled with the turbine charges an electrical energy storage device during operating the engine at the lower load.

13. The method of claim 12 wherein the step of passing exhaust gases through the particulate reduction device comprises reducing exhaust pressure, the method further comprising a step of compensating for reducing exhaust gas pressure at least in part by increasing exhaust gas temperature via the combusting step.

14. The method of claim 13 wherein the step of passing exhaust gases further comprises the steps of feeding exhaust gases into an exhaust inlet of the particulate reduction device, expelling the exhaust gases via an exhaust outlet of the particulate reduction device, and passing the exhaust gases between the exhaust inlet and the exhaust outlet without changing an average flow direction of the exhaust gases.

15. The method of claim 14 wherein the step of rotating a turbine includes rotating a turbine of a turbocharger for the internal combustion engine.

16. The method of claim 13 further comprising a step of assisting rotating the turbocharger via the rotary mechanism in response to a change in engine load.

17. The method of claim 12 wherein the step of passing exhaust gases during operating at the higher engine load includes conveying exhaust gases into an inlet of the particulate reduction device at a temperature between about 500° C. and about 760° C., and wherein the step of combusting further includes retarding the exhaust gases based on a non-catalytic residence time requirement for combustion of the particulates within the particulate reduction device.

18. An exhaust system segment for an exhaust system of an internal combustion engine comprising:
   a housing including an exhaust inlet configured to fluidly connect with an upstream segment of the exhaust system, and an exhaust outlet configured to fluidly connect with a downstream segment of the exhaust system having a turbine positioned therein;
   an exhaust flow retarder positioned within the housing, the exhaust flow retarder being configured to reduce particulates in exhaust gases passing between the exhaust inlet and the exhaust outlet at least in part by increasing a residence time of the particulates to a combustion initiating residence time within the exhaust system segment, wherein the exhaust flow retarder further includes a self-regenerating trapping element defining a combustion efficacy to exhaust mass flow and temperature coefficient for the exhaust system segment which is based at least in part on the combustion initiating residence time;
   the self-regenerating trapping element having a plurality of flow-through cartridges arranged in parallel and each having a non-perforated tube, and a fibrous metallic material disposed within the non-perforated tube fluidly between the exhaust inlet and the exhaust outlet; and
   a regeneration device coupled with the trapping element, and wherein the exhaust system segment includes a first state at which the engine is operated at a lower load and the trapping element regenerates via energizing the regeneration device such that trapped particulates are oxidized via supplemental heat of the regeneration device, and a second state at which the engine is operated at a higher load and a temperature of exhaust gases conveyed into the housing is between about 500° C. and about 760° C. such that the trapping element self-regenerates via residence of particulates passing therethrough.

* * * * *